United States Patent
Wilfinger et al.

(10) Patent No.: US 7,929,143 B2
(45) Date of Patent: Apr. 19, 2011

(54) INTEGRATED RESONATING GYRO ACCELEROMETER IN A SEMICONDUCTOR SUBSTRATE

(75) Inventors: Ray Wilfinger, Palm Harbor, FL (US); Eric Bailey, New Port Richey, FL (US); Carl Wingard, Oldsmar, FL (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 12/330,419

(22) Filed: Dec. 8, 2008

(65) Prior Publication Data
US 2011/0051144 A1   Mar. 3, 2011

(51) Int. Cl.
*G01B 9/02* (2006.01)
(52) U.S. Cl. .......................... 356/460; 356/73
(58) Field of Classification Search .............. 356/73, 356/459–462
See application file for complete search history.

(56) References Cited

U.S. PATENT DOCUMENTS

| 3,614,677 | A | 10/1971 | Wilfinger |
| 6,801,319 | B2 * | 10/2004 | Szafraniec et al. ........... 356/460 |
| 2008/0013094 | A1 | 1/2008 | Wilfinger |

* cited by examiner

*Primary Examiner* — Hwa S. A Lee
(74) *Attorney, Agent, or Firm* — Black Lowe & Graham PLLC

(57) ABSTRACT

An integrated interferometric gyroscope and accelerometer device. An example device includes a cantilever beam, a package having a post connected to one end of the beam, a piezoresistor driver, a piezoresistor sensor, and a semiconductor interferometric optical gyro. The piezoresistor driver is incorporated within the beam at a first area proximate to the post. The driver electro-thermally resonates the beam. The piezoresistor sensor is incorporated within the beam at the first area. The sensor piezoresitively senses a signal that relates to an acceleration force out-of-plane of the beam. The semiconductor interferometric optical gyro is also incorporated within the beam at a second area of the beam. The gyro senses rotational motion about an axis approximately equivalent to the acceleration force out-of-plane of the beam. The gyro includes a waveguide, a laser source and a light detector. The beam is formed from a semiconductor substrate.

18 Claims, 3 Drawing Sheets

INTEGRATED RESONATING GYRO ACCELEROMETER IN A SEMICONDUCTOR SUBSTRATE

GOVERNMENT INTEREST

The invention described herein was made in the performance of work under U.S. Government Contract No. SC001-00000000145/US Navy N00030-05-C-0007. The Government may have rights to portions of this invention.

BACKGROUND OF THE INVENTION

A Pendulating Integrating Gyroscopic Accelerometer (PIGA) is a type of accelerometer that can measure acceleration and simultaneously integrates this acceleration against time to produce a speed measure as well. The PIGA's main use is in Inertial Navigation Systems (INS) for guidance of aircraft and most particularly for ballistic missile guidance. It is valued for its extremely high sensitivity and accuracy in conjunction with operation over a wide acceleration range. The PIGA is still considered the premier instrument for strategic grade missile guidance though systems based on MEMS technology are attractive for lower performance requirements.

However, the PIGA has significant size and weight that make it non-optimum in many applications. Also, the PIGA is a mechanical mechanism requiring high precision machining tolerances and thus are very expensive to manufacture.

SUMMARY OF THE INVENTION

The present invention provides an integrated interferometric gyroscope and accelerometer device. An example device includes a cantilever beam, a package having a post connected to one end of the beam, a piezoresistor driver, a piezoresistor sensor, and a semiconductor interferometric optical gyro. The piezoresistor driver is incorporated within the beam at a first area proximate to the post. The driver electro-thermally resonates the beam. The piezoresistor sensor is incorporated within the beam at the first area. The sensor piezoresitively senses a signal that relates to an acceleration force out-of-plane of the beam. The semiconductor interferometric optical gyro is also incorporated within the beam at a second area of the beam. The gyro senses rotational motion about the axis that is same as the acceleration vector (out-of-plane of the beam). The gyro includes a waveguide, a laser source and a light detector. The beam is formed from a semiconductor substrate.

In one aspect of the invention, the semiconductor substrate is a single silicon substrate.

In another aspect of the invention, the light source and light detector (laser diodes) includes a P-N junction formed within a layer of the substrate.

In still another aspect of the invention, the interferometric optical gyro further comprises interface electronics formed at a third area of the beam.

In yet another aspect of the invention, the device includes a sensor package lid that is hermetically sealed with the package.

BRIEF DESCRIPTION OF THE DRAWINGS

Preferred and alternative embodiments of the present invention are described in detail below with reference to the following drawings.

DETAILED DESCRIPTION OF THE INVENTION

The present invention is a gyro and accelerometer integrated into a single semiconductor substrate that is combinable into a 3-axis gyroscope/accelerometer. As such the single semiconductor substrate has the ability to simultaneously sense linear and rotational forces.

Figure 1:
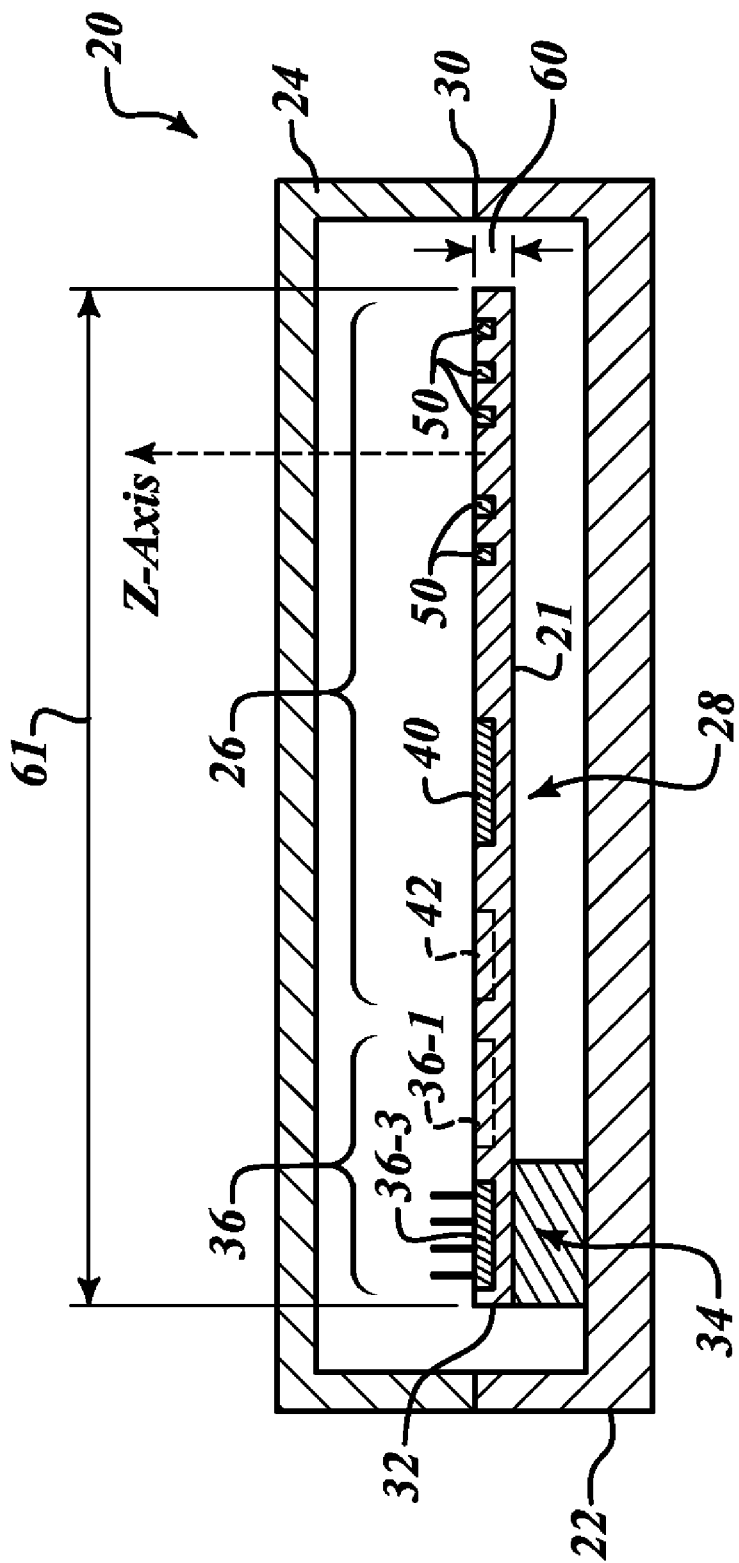
FIG. 1 is a cross-sectional view of an example device formed in accordance with an embodiment of the present invention.
Figure 2:
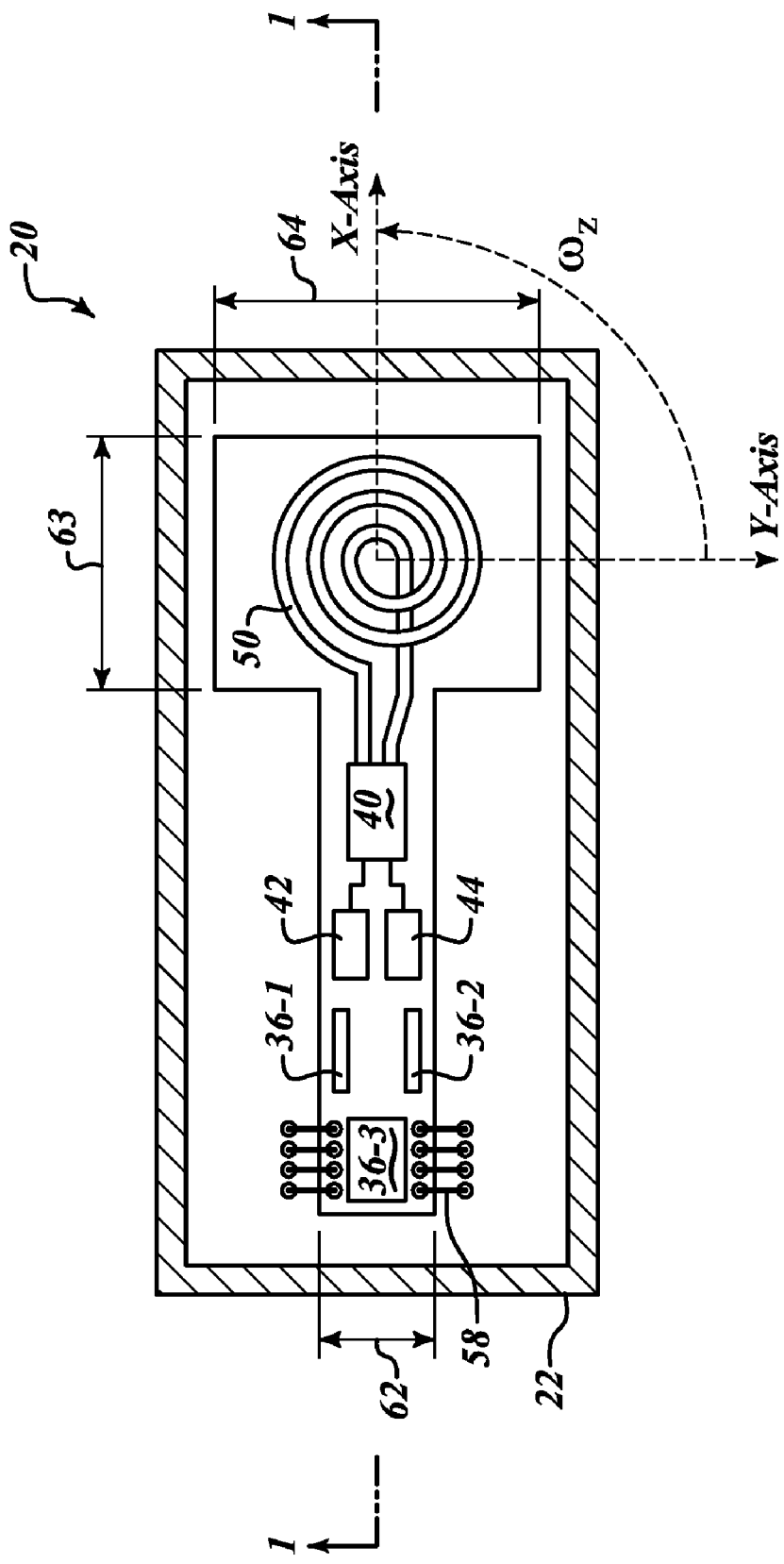
FIG. 2 is a top view of the device shown in FIG. 1.

As shown in FIGS. 1 and 2, an example integrated gyro accelerometer device 20 includes a cantilever strain-resistive beam 21 formed from a semiconductor substrate layer 32. The cantilever strain-resistive beam 21 includes a semiconductor Interferometric Fiber-Optic Gyro (IFOG) 26 and a resonating components 36. The beam 21 is driven electro-thermally to resonate by means of an implanted piezoresistor driver 36-1. Change in beam resonance (i.e., acceleration along the z-axis) is sensed piezoresistively by an implanted piezoresistor sensor 36-2. The piezoresistor implants are located at the opposite end of the beam 21 that incorporates the semiconductor IFOG 26.

An example of the resonating beam accelerometer with implanted piezoresistor elements (36) is shown and described in U.S. Pat. No. 3,614,677, the contents of which are hereby incorporated by reference.

An example of the semiconductor IFOG 26 is shown and described in U.S. Patent Application No. 2008/0013094 filed Jul. 14, 2006, the contents of which are hereby incorporated by reference.

In one embodiment, the beam 21 is formed from a semiconductor material, such as silicon, gallium-arsenide or comparable material, with a thickness to allow it to resonant based on a mass-spring configuration. Force due to acceleration is transformed into a load that acts axially (z-axis) on the beam 21. The magnitude of the acceleration is related to the change in the silicon beam resonant frequency, which is sensed based on the frequency of the signal sent to the driver 36-1 and received by the sensor 36-2. The vector component of acceleration is perpendicular to the beam 21. A DC voltage is applied with a superimposed sinusoidal signal to the piezoresistor driver 36-1, thus producing a cyclic heating and cooling of the driver 36-1, which causes the cantilever silicon beam 21 to deflect and oscillate. The piezoresistor sensor 36-2 detects change in frequency of the resonating cantilever silicon beam 21. The resonating frequency change in the silicon beam 21 is due to the load generated by the acceleration component along the z-axis. Acceleration sensor resolution is a function of the superimposed sinusoidal frequency, dimensional parameters 60-64 of the beam 21 and the type of semiconductor, as shown in FIGS. 1 and 2.

The beam 21 is attached at one end to a post 34 that is part of a sensor package 22. This produces space 28 below the beam 21 that allows the beam 21 to flex along the z-axis. Circuitry 36-3 associated with the piezoresistor elements (36-1, 36-2) is located at the end of the beam 21 over the post 34. The associated circuitry 36-3 includes an oscillator circuit (not shown) for driving the piezoresistor driver 36-1 and a feedback circuit (not shown) for receiving signals from the piezoresistor sensor 36-2. The associated circuitry 36-3 is connected to the piezoresistor elements (36-1, 36-2) via surface electrical traces (not shown). Other surface electrical traces connect the associated circuitry 36-3 with leads 58 that connect to other traces included in the package 22 for communicating signals off-package.

The IFOG 26 includes a curved optical waveguide 50 that is incorporated at the non-attached end of the beam 21 with a ω rotational component wrapped around the vector of acceleration (i.e. around the z-axis). The IFOG 26 also includes a light source (laser diode) 42, a light detector (photo diode) 44, and IFOG interface electronics 40 (i.e., integrated optics chip (IOC)). The light source (laser diode) 42 and the light detector (photo diode) 44 are in optical communication with the optical waveguide 50 formed in the semiconductor substrate. The light source (laser diode) 42, the light detector (photo diode) 44, and the IFOG interface electronics 40 are in signal communication with the leads 58 via surface electrical traces (not shown). The leads 58 connect to pads (not shown) that allow the package 22 to connect to other off-package devices. The IFOG 26 senses a rotational force about an axis (z-axis) that passes through the center of the optical waveguide 50 in accordance with known gyro principles.

The components on the beam 21 may be covered by a passivation layer, such as glass, for protecting the components.

A sensor package lid 24 is hermetically attached to the sensor package 22 using a hermetic seal 30, thus encasing the beam 21. The cavity formed is back filled with an inert gas or includes a vacuum. At the end of the beam 21 that is located above the post 34, multiple wires are bonded to both the cantilever beam 21 and contacts or traces located on the sensor package 22 that lead to external portions of the package 22 for external connections.

Figure 3:
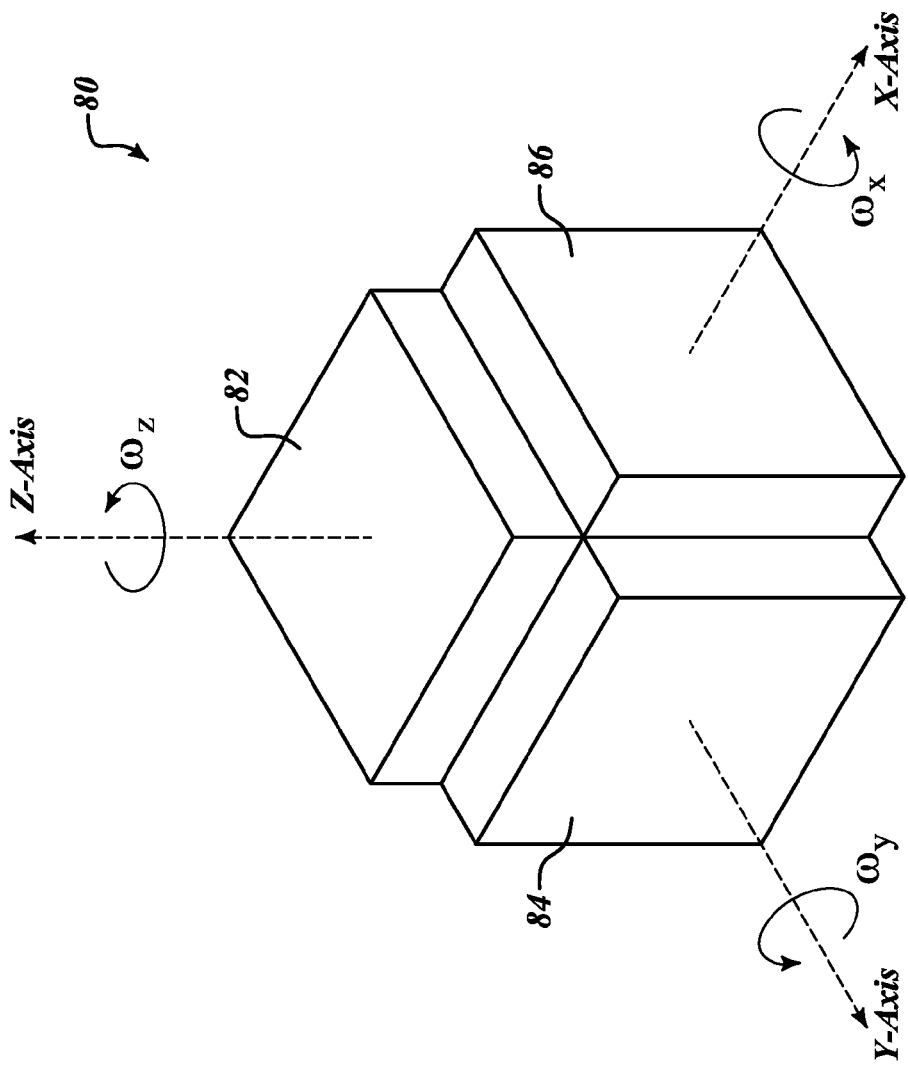
FIG. 3 is a perspective view of a 3-axis gyro/accelerometer system formed in accordance with an embodiment of the present invention.

FIG. 3 illustrates a three-accelerometer, three-gyro system 80. The system 80 includes three integrated gyro accelerometers 82, 84 and 86 attached in an orthogonal relationship to a base. At time of construction of each of the separate integrated gyro accelerometers 82, 84 and 86, the precise center location of the IFOG 26 (i.e. the center of the coiled waveguide 50) is determined. Each determined center point is the point at which the z-axis passes through the respective beams 21. When attached to form the device 80 as shown in FIG. 3, those known z-axis points are used to properly orient/attach the gyro accelerometers 82, 84 and 86 relative to one another about the base.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An integrated interferometric gyroscope and accelerometer device, the device comprising:
   a cantilever beam;
   a package comprising a post connected to one end of the beam;
   a driver incorporated within the beam at a first area proximate to the post, the driver configured to electro-thermally resonate the beam;
   a sensor incorporated within the beam at the first area, the sensor configured to sense a signal that relates to an acceleration force out-of-plane of the beam; and
   a semiconductor interferometric optical gyro incorporated within the beam at a second area of the beam, the gyro being incorporated to sense rotational motion about an axis approximately equivalent to a vector corresponding to the acceleration force.

2. The device of claim 1, wherein the gyro comprises a waveguide, a light source and a light detector.

3. The device of claim 2, wherein the beam is formed from a semiconductor substrate.

4. The device of claim 3, wherein the semiconductor substrate is a single silicon substrate.

5. The device of claim 3, wherein the light source is formed within a layer of the substrate.

6. The device of claim 3, wherein the interferometric optical gyro further comprises interface electronics formed at a third area of the beam.

7. The method of claim 2, wherein the light detector is a photo diode.

8. The device of claim 1, further comprising a sensor package lid that is hermetically sealed with the package.

9. The device of claim 1, wherein the driver is a piezoresistor driver and the sensor is a piezoresistor sensor.

10. A method for sensing a rotational force and an acceleration force, the method comprising:
    electro-thermally resonating a cantilever beam mounted at one end to a post of a package;
    sensing a signal that relates to an acceleration force out-of-plane of the beam; and
    sensing rotational motion of the beam about an axis approximately equivalent to a vector corresponding to the acceleration force, wherein sensing rotational motion using a semiconductor interferometric optical gyro incorporated within the beam.

11. The method of claim 10, wherein the gyro comprises a waveguide, a light source and a light detector.

12. The method of claim 11, wherein the beam is formed from a semiconductor substrate.

13. The method of claim 12, wherein the semiconductor substrate is a single silicon substrate.

14. The method of claim 12, wherein the light source is formed within a layer of the substrate.

15. The method of claim 12, wherein the interferometric optical gyro further comprises interface electronics formed on the beam.

16. The method of claim 11, wherein the light detector is a photo diode.

17. The method of claim 10, further comprising hermetically sealing the beam within the package.

18. The method of claim 10, wherein electro-thermally resonating is performed by a piezoresistor driver and sensing the signal that relates to an acceleration force is performed by a piezoresistor sensor.

* * * * *